Patented June 29, 1943

2,322,822

UNITED STATES PATENT OFFICE 2,322,822

OIL AND WATER EMULSION CONTAINING ELECTROLYTES

Kenneth R. Brown, Tamaqua, Pa., assignor to Atlas Powder Company, Wilmington, Del., a corporation of Delaware No Drawing. Application August 23, 1940, Serial No. 353,921

12 Claims. (Cl. 252—312)

The present invention relates to oil and water emulsions containing electrolytes.

The principal object of this invention is the provision of a stable oil and water emulsion which has an electrolyte contained therein, and having an emulsifier comprising certain types of the long chain fatty acid esters of polyhydroxylic compounds including cyclic inner ethers of hexitols and hexane pentols and the external ethers or polyethers thereof.

In my copending application, Serial No. 341,903, filed June 22, 1940, I have disclosed certain novel compositions of general utility in the arts, particularly as emulsifying agents. By the use of these materials as emulsifying agents I have discovered that novel emulsions of great stability can be prepared even in the presence of electrolytes that interfere with the stability of emulsions made with most of the previously known emulsifiers. These novel emulsions are highly useful in that they furnish convenient means for employing electrolytes for a wide variety of arts.

Many of the arts have need of an emulsion, such as a cream, as a vehicle for electrolytes. In the cosmetic and drug industries, for instance, this need is well recognized in connection with depilatories, anti-perspirants, deodorants, antiseptics and the like. (See, for example, the article "Ointment Bases" appearing in The Drug and Cosmetic Review 1940–1, pages 298–300.) The problem has been to produce emulsions of practical stability because electrolytes, especially strong electrolytes, tend to break emulsions either at once or after standing a short time. Emulsions offer very attractive advantages in these fields in that, among other things, both oil-soluble and water-soluble medicaments can be incorporated into the emulsion, many of the electrolytes can be kept in a dissolved condition in the aqueous phase so that they do not crystallize and are rapidly effective, the emulsions offer a means of applying medicaments in an emollient composition, and concentrations of water soluble electrolytes can be controlled readily since they are usually present in a state of solution in the aqueous phase. These are not the only arts in which such emulsions are useful. Any art in which it is advantageous to use an electrolyte in the form of an emulsion with oily material may find these emulsions valuable.

The emulsions of the present invention offer the advantages associated with emulsions generally, but furthermore have a number of novel advantages in addition to the usual ones. By comparison with emulsions prepared with ordinary emulsifiers my emulsions have greatly improved stability towards electrolytes. Another advantage is that my emulsions remain in good condition even in very dry atmospheres because of the fact that they are for the most part water-in-oil emulsions and the external oil phase greatly retards evaporation of the water phase. Also because the water phase is internal, my emulsions retain materials dissolved in the water phase in dissolved condition and are not subject to loss of such dissolved materials or to crystallization thereof. This last named advantage is of particular importance in cases where the emulsion is to be applied to the skin where the presence of crystals would cause scratching and irritation.

The emulsions of the present invention can carry various electrolytes. Weak electrolytes like tannic acid, boric acid, phenols and calomel; or strong electrolytes like sodium sulfate, aluminum sulfate, and hydrochloric acid, can be used. Emulsions can be made with strong alkalies also. However, such compositions are generally less stable than compositions containing more nearly neutral or acid electrolytes. Many other electrolytes can likewise be used and this list is to be taken as suggestive only and not limitative.

According to the present invention emulsions are prepared from a suitable oily material, water, the electrolyte desired, and an emulsifier comprising certain of the long chain fatty acid esters of polyhydroxylic compounds comprising cyclic inner esters of hexitols and hexane pentols and the external ethers and polyethers thereof. More particularly, the emulsifier comprises ester material of the type just mentioned in which the long chain fatty acid is combined with the polyhydroxylic compound in the ratio of substantially 1 equivalent of acid to each 6 carbon atoms of the polyhydroxylic compound and in which the emulsifier has a ratio of hydroxyl value to ester value of from about 0.5 to 2.0.

The oil phase of the emulsions can be selected from a large group of oils, fats, waxes, and wax-like materials, of animal, vegetable, mineral or synthetic origin. A few of the materials that can be used are oils and wax-like substances of petroleum origin, animal waxes and wax-like materials such as beeswax, spermaceti and lanolin, animal fats like tallow and lard, vegetable oils like olive oil, and synthetic materials like hydrogenated oils. The substances just named are not the only ones available for use in my emulsions but are given solely for the purpose of illustrating the invention to those skilled in the art.

Compounds of the type contemplated for use as emulsifiers in the emulsions of the present invention are described in detail and claimed in my said copending application, Serial No. 341,903 to which reference should be had for details of chemical structure, methods of preparation, sources of materials, etc., it being understood that the emulsifiers of the present invention include all of the compositions of my earlier application. For the purposes of the present invention, it will suffice to say that the emulsifiers are esterified polyhydroxylic materials of the types: cyclic inner ethers of hexitols, particularly the hexides; or mixtures of cyclic inner ethers of hexitols with cyclic inner ethers of hexane pentols; or external ethers or polymeric ethers of these materials, in which "polymeric" includes dimeric and further includes external ethers formed of identical or different inner ether units; or mixtures of two or more of the foregoing. These ethers can be prepared from the parent hexitols or mixtures thereof with hexane pentols and the ethers then esterified, but preferably the fatty acid and the parent polyhydric alcohol are reacted together under conditions producing etherification of the alcohols and also esters of the ethers. Pure polyhydric alcohols can be used if desired but, particularly in the case of sorbitol, commercially available mixtures are suitable and, in many cases, are preferable to the purer products. Commercial sorbitol syrups such as can be obtained, for example, by the electrolytic reduction of glucose or by the catalytic hydrogenation of glucose, comprise sorbitol together with hexane pentols.

The fatty acid which enters into the formation of the emulsifiers is preferably one having six or more carbon atoms, especially the acids found in the natural esters of animal and vegetable oils and fats, although synthetically produced acids, such as margaric, can be used.

I have found that the most desirable emulsifiers are obtained when the reaction is so conducted that on an average the hydroxyl and ester values of the resulting product are substantially those corresponding to a hexide monoester. In this case the ratio of the hydroxyl value to the ester value is one, that is:

$$\frac{\text{Hydroxyl value}}{\text{Ester value}} = \frac{\text{grams KOH equivalent to hydroxyl}}{\text{grams KOH equivalent to combined acid}}$$

$$= \frac{1 \text{ equivalent KOH}}{1 \text{ equivalent KOH}} = 1$$

Due to the incidence of side reactions, the use of mixed polyhydroxylic materials and also the use of mixed acids from natural sources, the range of useful products contemplated by my invention will be found to have values for the ratio of hydroxyl to ester of 2.0 to 0.5.

Since, when using stoichiometric proportions, the initial ratio of acid equivalent to carbon atoms of the polyhydroxylic material is 1/6, and since the etherification and esterification process involve only the loss of water with no loss of carbon, the ratio of acid equivalents to atoms of polyhydric residue carbon in the product is still 1/6, regardless of the extent of internal or external etherification. While the preferred ratio of acid equivalents to polyhydroxylic carbon atoms is 1/6 or 0.166, useful products may be obtained having ratios of somewhat less than 0.16, preferably not below about 0.15, and also ratios somewhat higher than 0.16, preferably not over 0.25.

Instead of starting with the hexitols or mixed polyhydric alcohols, I may use preformed monoanhydrides of hexitols (hexitans) or dianhydrides of hexitols (hexides) or anhydrides of hexane pentols. For example, when starting with the hexides, I may carry out the esterification under nonetherifying conditions such as by using the acid chloride and pyridine, or any other suitable base, to neutralize the hydrochloric acid, formed in the reaction, or I may use the acid anhydride in place of the acid chloride. Esterifying a hexide in this manner gives only monomeric hexide esters. I may also react hexitols or mixtures thereof comprising hexane pentols, with mineral acids, or under etherifying conditions, in the absence of organic acid, purify the resulting mixture of mono- and polymeric inner ethers thus obtained with decolorizing carbon or other methods, and then esterify the resulting mixture or hydroxylic ethers with fatty acid under nonetherifying conditions.

The following examples from my application, Serial No. 341,903 are set out to illustrate the preparation of some of the emulsifiers that can be used in making the emulsions of the present invention.

*Example 1*

182 g., dry basis, of technical sorbitol syrup, with solids comprising about 80% sorbitol and the remainder non-sorbitol polyhydroxylic materials, largely saccharitols, were placed in a flask and adjusted to a pH of 2.0 by the addition of 2.0 cc. of 85% $H_3PO_4$. To the resulting material were added 216 g. of distilled coconut fatty acids having an acid number of 275 and containing approximately 60% of lauric acid. This quantity of coconut oil fatty acid was 1.054 times the equivalent weight of fatty acid, the 5.4% excess of acid being used to compensate for acids distilled during the reaction. The reactants were heated together with agitation in an inert atmosphere of carbon dioxide for a total of two and one-half hours at 225° C. The reaction mixture had become uniformly clear in appearance after two hours at 225° C. and was then given a decolorizing treatment with a commercial activated carbon known as "Darco G-60." This treatment consisted in adding 2% Darco based on the total weight of the charge during the last half-hour of the heating at 225° C. The mixture was subsequently filtered free of carbon.

The product was an oily liquid having the following properties:

Hydroxyl value_____ 205
Ester value_____ 170
Viscosity at 25° C_____centipoises__ 439

The product was largely composed of the sorbide monoesters of coconut oil fatty acids together with small amounts of sorbitan esters and other ether-esters. It was a reddish yellow oil having a color of 60 units when read on a Hess-Ives Tint Photometer using a 6 mm. cell.

This material proved especially useful in the preparation of emulsions made in the presence of electrolytes such as water-in-oil emulsions where aluminum chloride or aluminum sulfate was present in the emulsion mixture, and oil-in-water emulsions containing electrolytes such as citric acid.

Example 2

3185 g. (17.5 mols) technical sorbitol syrup (of the type used in Example 1) measured on a dry basis were adjusted to a pH of 2.0 by the addition of 24 cc. 85% $H_3PO_4$. This syrup was then reacted with 4970 g. (about 17.5 mols) of triple-pressed stearic acid in an inert atmosphere of carbon dioxide for three hours twenty-five minutes at 245° C. The product was treated with 2% of its weight of activated carbon (Darco G-60) for one-half hour at 200° C. and subsequently filtered free of carbon. It was then deodorized for two hours at 140° C. by means of superheated steam and subjected to a second 2% Darco treatment. The final product had a color of 89 units as measured in a 6 mm. Hess-Ives Tint Photometer cell, and the following analytical values:

| | |
|---|---|
| Acid number | 4.5 |
| Hydroxyl value | 218 |
| Ester value | 135.5 |
| Melting point °C | 42-43 |

The ester portion was composed principally of sorbide monoesters of triple pressed stearic acid and the remainder of sorbitan and other ether-esters of triple pressed stearic acid.

Example 3

114 g. (about 0.5 mol) of commercial myristic acid and 91 g., dry basis (0.5 mol), technical sorbitol syrup (as in Example 1) which had been adjusted to a pH of 1.8 by the addition of $H_3PO_4$ were reacted for a period of one hour at 210° C. The reaction mixture was given an additional half-hour heating treatment at 210° C. in the presence of 2% Darco G-60 decolorizing carbon and was subsequently free of the carbon. The product had a color of 60 Hess-Ives units as read directly in a 6 mm. Hess-Ives Tint Photometer cell. The product had the following analytical values:

| | |
|---|---|
| Acid number | 6 |
| Hydroxyl value | 180 |
| Ester value | 161 |

The product comprising principally sorbide monomyristate was an excellent emulsifier. A 1% solution of the myristate in corn oil reduced the interfacial tension between this corn oil and water from 22.2 dynes cm. to 2.6 dynes/cm.

Example 4

335 g. distilled coconut oil fatty acids were reacted with 285 g. mannitol in the presence of 7.71 cc. 85% $H_3PO_4$ for a total of two and one-quarter hours at 235° C. During the last half-hour at 235° C. the reaction mixture was given a Darco G-60 decolorizing treatment employing 2% Darco based upon the reactant weight. The reaction mixture was cooled to 180° C. and filtered free of carbon. The product was a reddish oil having a color of 70 Hess-Ives units as measured directly in a 6 mm. Hess-Ives tint photometer cell and had the following analytical values:

| | |
|---|---|
| Acid number | 5 |
| Hydroxyl value | 180 |
| Ester value | 165 |

The product was composed chiefly of the mannide monoesters of the distilled acids derivable from coconut oil.

Example 5

378 g. (about one and one-third mols) triple-pressed stearic acid were reacted with 242 g. (about one and one-third mols) mannitol in the presence of 0.55 cc. 85% $H_3PO_4$ for a total of four hours at 245° C. During the last half-hour at 245° C. the reaction mixture was given a 2% Darco G-60 decolorizing carbon treatment. The product was cooled to 180° C. and filtered free of carbon. The product was a yellow solid having the following analytical values:

| | |
|---|---|
| Acid number | 4 |
| Hydroxyl value | 170 |
| Ester value | 138 |
| Melting point degrees centigrade | 41-42 |

Example 6

438 g. of white olein, representing about 1.5 mols oleic acid, were reacted with 273 g. (1.5 mols) mannitol in the presence of 1.64 cc. 85% $H_3PO_4$. The reaction was carried out in a glass flask equipped with an agitator, a carbon dioxide inlet tube to permit the use of an inert atmosphere and an inverted U air condenser. The reactants were heated with agitation in an inert atmosphere of carbon dioxide for one and one-half hours at 220-225° C. after which time the reaction mixture became uniformly clear in appearance. The product was given a 2% Darco G-60 treatment at this time and the heating continued for an additional half-hour at 220-225° C. The product was filtered free of carbon. It was a reddish yellow oil having a color of 130 Hess-Ives units as measured directly in a 6 mm. Hess-Ives tint photometer cell and having the following analytical values:

| | |
|---|---|
| Acid number | 7 |
| Hydroxyl value | 150 |
| Ester value | 145 |
| Viscosity at 25° C centipoises | 1200 |

The product was composed chiefly of mannide monooleate.

In preparing my novel emulsions comprising electrolytes conventional methods of emulsification can be used, the emulsifiers described above being used in whole or in part as the emulsifying agent. Typical examples of these emulsions are set out below but the invention is not to be taken as limited to these examples.

Example 7

2 g. of the product of Example 4 were dissolved in a mixture of 28 g. petrolatum and 10 g. beeswax at 70° C. 20 g. aluminum chloride (hydrated) were dissolved in 40 g. water and the solution heated to 70° C. The solution of aluminum chloride was added to the petrolatum mix and the mixture stirred mechanically until it had cooled to room temperature. The resulting emulsion was of the water-in-oil type and was very useful as a perspiration inhibitor and astringent.

If desired, the beexwax in the above emulsion may be replaced by paraffin wax, or may be replaced by the use of additional quantities of petrolatum.

Example 8

38 parts of petrolatum were melted and held at about 70° C. at which time 2 parts of the product of Example 1 were admixed with stirring. 20 parts of sodium sulfate were dissolved in 40 parts water and the solution raised to about 70° C. The sodium sulfate solution was then added slowly to the oil while constantly stirring the latter. There resulted a smooth emulsion which was quite stable even after long standing. In place of sodium sulfate other electrolytes such as aluminum sulfate can be employed.

Example 9

28 parts of petrolatum and 10 parts of beeswax are melted together at 70° C. and 2 parts of the product of Example 6 stirred into the mix. A solution is made up with 20 parts aluminum sulfate in 40 parts water and heated to 70° C. The aluminum sulfate in solution is added slowly to the mix first prepared while constantly stirring the latter. Stirring is continued until the resulting emulsion cools to room temperature. The emulsion is of the water-in-oil type and is stable even after long standing. Such an emulsion is useful as an anti-perspirant.

Example 10

Prepare a solution of 20 parts concentrated HCl in 40 parts water and heat to 70° C. Prepare also a mix of 26 parts petrolatum, 10 parts beeswax and 2 parts of emulsifier comprising sorbide monooleate (prepared by substituting technical sorbitol for the mannitol in the process of Example 6) and heat this mix to 70° C. While stirring the latter mix constantly add the HCl solution slowly and continue the stirring after all is added until the emulsion cools to room temperature. This emulsion is perfectly stable over long periods and is useful as a source or carrier for the acid. Since the emulsion is of the water-in-oil type the aqueous phase is internal and the action of the acid is retarded. Such an emulsion can be used to etch metal surfaces.

Example 11

An oil phase is prepared by melting together 28 parts petrolatum, 10 parts beeswax, and 2 parts of the product of Example 1. The oil phase is maintained at 70° C. and a solution of 20 parts sodium alum in 40 parts water at 70° C. slowly added with continuous stirring. The stirring is continued until the emulsion cools to room temperature. A stable water-in-oil emulsion results which is useful as an astringent skin cream.

Instead of sodium alum in this cream a similar product can be prepared using potassium alum.

Example 12

A number of medicinal emulsions can be made up from an ointment base of the following composition:

| Ingredients | Percentage by weight |
|---|---|
| Emulsifier of Example 6 | 5 |
| Ceresin wax (melting point 156-160° F.) | 15 |
| Petrolatum | 20 |
| Mineral oil U. S. P. 65-70° Saybolt | 50 |
| Lanolin (anhydrous) | 10 |

The above ingredients are melted and mixed together. In the table below the above composition is referred to as "base."

| Emulsion number | Medicament | Percentage medicament | Phase in which medicament added | Base | Water |
|---|---|---|---|---|---|
| | | | | Per cent | Per cent |
| (a) | Zinc oxide | 10 | Oil | 50 | 40 |
| (b) | Tannic acid | 10 | Aqueous | 50 | 50 |
| (c) | Phenol | 0.5 | Oil | 50 | 49.5 |
| (d) | Calomel | 5.0 | Oil | 50 | 45 |
| (e) | Calomel | 20.0 | Oil | 50 | 30 |

The water phase preferably has added to it in each of the above examples two-tenths of a percent $MgSO_4.7H_2O$ based on the total composition for the purpose of increasing the heat stability of the emulsions.

In making up the emulsion both the water and the oil phases are separately heated to a temperature of about 60-65° C. and the aqueous phase is then added to the oil phase with constant stirring. After incorporation is complete the emulsion is preferably homogenized at 50-60° C. and is filled into jars while hot.

The above examples illustrate various types of ingredients that can be added without destroying the stability of the emulsions. In addition to those specifically mentioned many others are available. Among many others there might be mentioned boric acid, borax, salicylic acid, calcium sulfide and calcium hydroxide. Those of the above ingredients that are water soluble are preferably incorporated into the aqueous phase of the emulsion, whereas those that are relatively insoluble may either be suspended in the water phase or else mechanically carried by the oil phase.

The emulsions of the invention can contain various added materials. More than one electrolyte can be used if desired. As further ingredients I may add preservatives, antiseptics, a powdered material such as talc or starch to alter the feel or consistency of the emulsion, waxes or thickening agents to increase the body of the emulsion, or other materials known to those skilled in the art for imparting desired characteristics to a product. For example, where a heavy material, like a pigment, is to be kept suspended in the emulsion it is often advantageous to increase the body of the emulsion.

The invention is susceptible to many variations and is to be taken as limited only by the scope of the following claims.

I claim:

1. An emulsion comprising an oil phase, a water phase, an electrolyte, and an emulsifier consisting essentially of a mixture of hexide monoester of a fatty acid having at least 6 carbon atoms and the other esters produced in the reaction of a polyhydroxylic material selected from the group consisting of hexitols, hexitans, hexides, and mixtures of hexitols and hexane pentols, and the said fatty acid with at least 6 carbon atoms, said mixture having a ratio of fatty acid equivalents to carbon atoms of polyhydroxylic residue of from about 0.15 to 0.25, and the ratio of hydroxyl value to ester value of said mixture being from about 0.5 to 2.0.

2. An emulsion according to claim 1 wherein the electrolyte is dissolved in said water phase.

3. An emulsion according to claim 1 wherein the electrolyte is in the said oil phase.

4. An emulsion comprising an oil phase, a water phase, an electrolyte, and an emulsifier consisting essentially of a mixture of a hexide monoester of a fatty acid having at least 6 carbon atoms and the other esters produced in the reaction of a polyhydroxylic material selected from the class consisting of hexitols, hexitans, hexides, and mixtures of hexitols and hexane pentols, with the said fatty acid of at least 6 carbon atoms, said fatty acid being reacted with said polyhydroxylic material in the ratio of substantially 1 equivalent of said fatty acid to 6 carbon atoms of said polyhydroxylic material, and the ratio of hydroxyl value to the ester value of said mixture being about 1.

5. An emulsion comprising an oil phase, a water phase, an electrolyte, and an emulsifier consisting essentially of a mixture of a hexide fatty acid monoester and the other esters produced in the reaction of a polyhydroxylic material selected from the group consisting of hexitols, hexitans, hexides, and mixtures of hexitols and hexane pentols and a fatty acid with at least 6 carbon atoms derivable from the natural esters of the class consisting of animal and vegetable oils and fats, said mixture having a ratio of fatty acid equivalents to carbon atoms of polyhydroxylic residue of from about 0.15 to 0.25, and the ratio of hydroxyl value to ester value of said mixture being from about 0.5 to 2.0.

6. An emulsion comprising an oil phase, a water phase, an electrolyte, and a hexide monoester of a fatty acid with at least 6 carbon atoms as an emulsifier.

7. An emulsion comprising an oil phase, a water phase, an electrolyte, and a hexide monooleate as an emulsifier.

8. An emulsion comprising an oil phase, a water phase, an electrolyte, and a mannide monoester of a fatty acid with at least 6 carbon atoms as an emulsifier.

9. An emulsion comprising an oil phase, a water phase, an electrolyte, and a sorbide monoester of a fatty acid with at least 6 carbon atoms as an emulsifier.

10. An emulsion comprising an oil phase, a water phase, an electrolyte, and a hexide monoester of a fatty acid with at least 6 carbon atoms derivable from the natural esters of the class consisting of animal and vegetable oils and fats.

11. An emulsion comprising an oil phase, a water phase, an electrolyte, and a mannide monooleate as an emulsifier.

12. An emulsion comprising an oil phase, a water phase, an electrolyte, and a sorbide monooleate as an emulsifier.

KENNETH R. BROWN.

---

CERTIFICATE OF CORRECTION.

Patent No. 2,322,822.   June 29, 1943.

KENNETH R. BROWN.

It is hereby certified that error appears in the printed specification of the above numbered patent requiring correction as follows: Page 3, first column, line 56, Example 4, for "7.71 cc." read --1.71 cc.--; and that the said Letters Patent should be read with this correction therein that the same may conform to the record of the case in the Patent Office.

Signed and sealed this 17th day of August, A. D. 1943.

(Seal)

Henry Van Arsdale,
Acting Commissioner of Patents.

CERTIFICATE OF CORRECTION.

Patent No. 2,322,822. June 29, 1943.

KENNETH R. BROWN.

It is hereby certified that error appears in the printed specification of the above numbered patent requiring correction as follows: Page 3, first column, line 56, Example 4, for "7.71 cc." read --1.71 cc.--; and that the said Letters Patent should be read with this correction therein that the same may conform to the record of the case in the Patent Office.

Signed and sealed this 17th day of August, A. D. 1943.

(Seal)
Henry Van Arsdale,
Acting Commissioner of Patents.